United States Patent
Gaynier et al.

(10) Patent No.: US 6,713,967 B1
(45) Date of Patent: Mar. 30, 2004

(54) VEHICULAR LIGHTING CONTROL SYSTEM

(75) Inventors: John M Gaynier, Carleton, MI (US); Lisa A Gronowski, Lake Orion, MI (US); Joseph G. Machak, Oakland Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/390,102

(22) Filed: Mar. 17, 2003

(51) Int. Cl.[7] ................................................. B60Q 3/00
(52) U.S. Cl. ......................... 315/77; 315/84; 307/10.8
(58) Field of Search ............................. 315/77, 84, 82; 307/10.8, 10.1, 9.1; 362/459, 471, 487–492

(56) References Cited

U.S. PATENT DOCUMENTS

| | | | | |
|---|---|---|---|---|
| 4,638,174 A | * | 1/1987 | Bier | 307/10.1 |
| 4,739,224 A | * | 4/1988 | Geerlings | 315/84 |
| 4,866,345 A | * | 9/1989 | Kataoka | 315/84 |
| 5,047,688 A | * | 9/1991 | Alten | 315/84 |
| 5,583,382 A | * | 12/1996 | Wagner | 307/10.1 |
| 5,604,407 A | * | 2/1997 | Andres et al. | 315/77 |
| 5,831,389 A | * | 11/1998 | Kawashima et al. | 315/77 |

* cited by examiner

Primary Examiner—James Clinger
Assistant Examiner—Ephrem Alemu
(74) Attorney, Agent, or Firm—Edwin W. Bacon, Jr.

(57) ABSTRACT

A vehicular interior lighting system features a lamp assembly having two input terminals, each connected to a power source via two control switches. The lamp assembly further includes a lighting element connected at one end to an input terminal and at the other end to dual position manual switch that is connected in parallel to a diode. This configuration allows the lighting element to be illuminated from either the control switches or via the manual switch, depending on the polarity.

6 Claims, 4 Drawing Sheets

VEHICULAR LIGHTING CONTROL SYSTEM

FIELD OF THE INVENTION

The present invention relates generally to vehicular lighting control schemes, and in particular, to an interior lighting control system for an automobile.

BACKGROUND OF THE INVENTION

Conventional methods for controlling interior vehicle lighting systems generally include either two switching power feeds and one ground connection to multiple lamp assemblies, or two switching ground connections and one power feed to multiple lamp assemblies. In either case, there are a minimum of three circuits required per lamp assembly to achieve the desired functionality. Essentially, interior vehicle lights need to function in a manner that allows the interior lamps to be controlled at the lamp assembly using a lamp switch, and also separately when a door is open or the interior dome switch is turned on.

SUMMARY OF THE INVENTION

In accordance with the teachings of the present invention, a lamp assembly has first and second input terminals, adapted to be coupled to an electric power source, a lighting element having a first end and a second end, the first end coupled to the first terminal, a dual position manual switch coupled between the second end of the element and the second terminal, and a diode coupled between the second end of the element and the second terminal. This arrangement allows the lamp assembly to illuminate the lighting element either via the manual switch or automatically by selecting an appropriate polarity of the potential appearing across the first and second terminals. In addition, the lamp assembly circuit of the present invention reduces the number of circuits required to perform the desired functions which results in substantial cost savings per vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
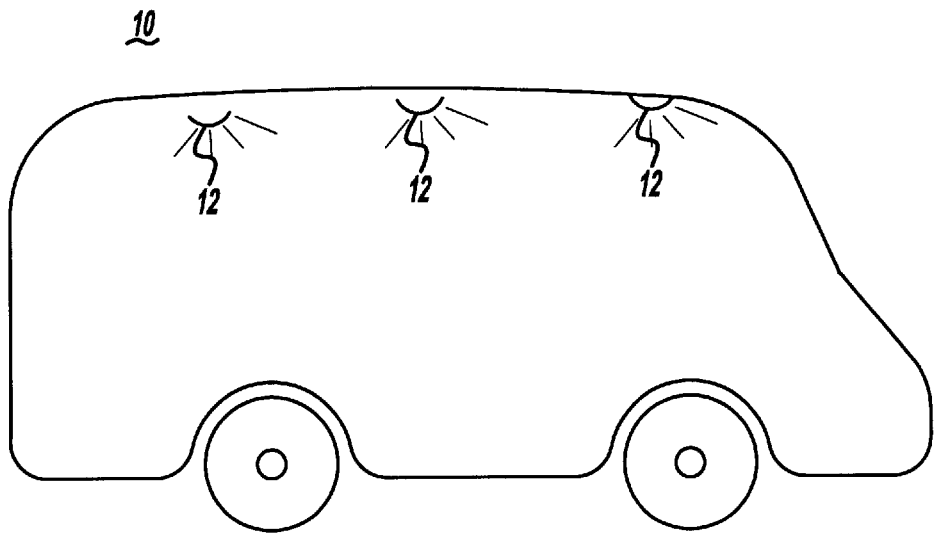
FIG. 1 is an isometric view of an automobile implementing the interior lighting control system according to the present invention.

FIG. 1 shows an automobile 10 having a front, middle and rear lamp assembly 12 operable via the interior lighting control system according to the present invention.

Figure 2:
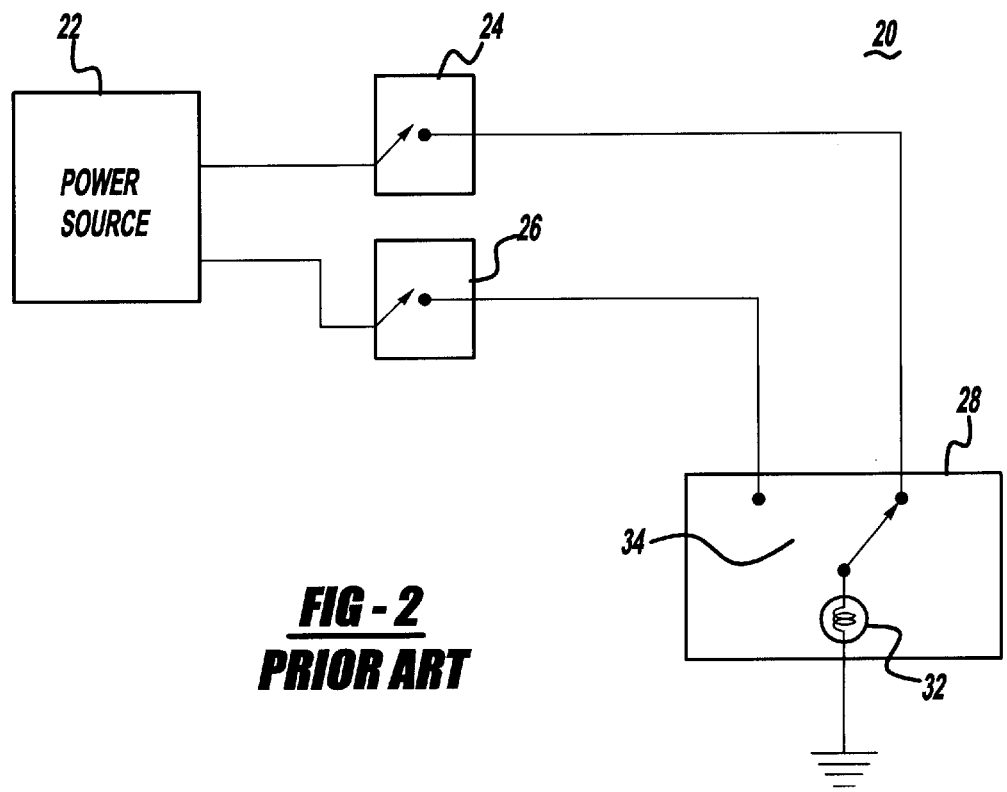
FIG. 2 is a schematic diagram of a conventional, single lamp, interior lighting control assembly.

FIG. 2 illustrates a conventional interior lighting system 20 utilizing a three-terminal lamp assembly 28 and having a power source 22, and two switching elements 24, 26. One switch 24 is for automatic operation, and the other switch 26 is for manual operation. Both switches are connected to the lamp assembly 28. Each switch 24, 26 is controlled by a control module (not shown). Switches 24 and 26 may comprise solid state or relay type switches. Lamp assembly 28 has a lighting element, such as an incandescent or fluorescent bulb 32 and a dual contact manual switch 34. As illustrated in the conventional system shown in FIG. 2, each lamp assembly 28 requires three terminals coupled to a respective circuit.

Figure 3:
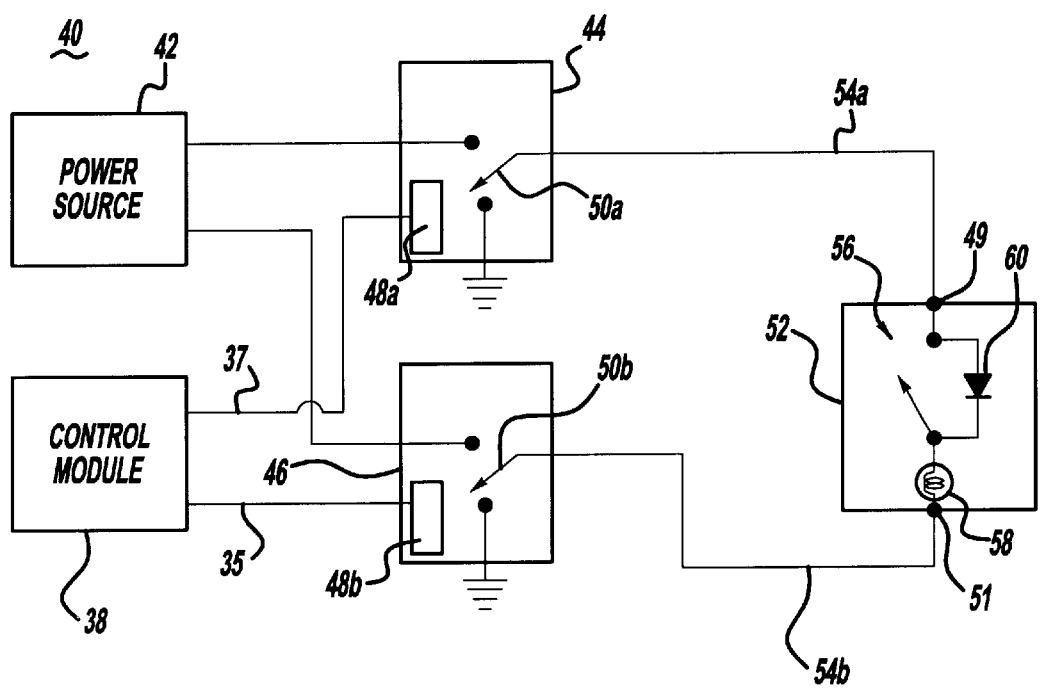
FIG. 3 is a schematic diagram of a single lamp interior lighting assembly according to the present invention.

FIG. 3 illustrates a lighting control system 40 providing the same dual function of the conventional system of FIG. 2, but with lamp assembly 52 having only two terminals and associated circuits. Hence, the wiring complexity is reduced over that of the prior art.

According to the present invention, a single lamp assembly 52 has power source 42 supplying 12 volt DC to courtesy and reading switches 44, 46, respectively. Switches 44 and 46 are dual state switches which may be comprised of electromagnetic relays or solid state devices. Switch 44 has a control input 37 coupling a switch activating element 48a to a control module 38. In a first state switch 44 couples a non-zero voltage from power source 42 to a first terminal 49 of lamp assembly 52 via lead 54a. In a second state, switch 44 couples ground potential to first terminal 49.

Similarly, switch 46 has a control input 35 coupling a switch activating element 48b to control module 38. In a first state, switch 46 couples a non-zero potential from power source 42 to a second terminal 51 of lamp assembly 52 via lead 54b. In a second state, switch 46 couples ground potential to second terminal 51.

Control module 38, in a typical vehicle, could be comprised of a micro-processor-based power distribution module or a body control module. Control module 38 selectively sets these states of switches 44 and 46 via control inputs 37 and 35, respectively.

In the specific example of FIG. 3, switches 44 and 46 are shown as relays, with relay 44 having an actuating coil 48a and a transfer contact 50a. Relay 46 has an actuating coil 48b and a transfer contact 50b.

Lamp assembly 52 generally includes lighting element 58, a dual position manual switch 56, and a diode 60. Lighting element 58 connects at one end to input terminal 51, and at the other end to contact 56 and a cathode of diode 60. Switch 56 is connected in parallel to diode 60 such that the anode of diode 60 terminates at lamp assembly input terminal 49.

With the arrangement shown in FIG. 3, lighting element 58 can be supplied illuminating current in one of two ways. First with coil 48a of relay 44 energized, a positive potential is applied to first terminal 49. Simultaneously, coil 48b of relay 46 is left unenergized, thereby applying ground potential to second terminal 51. With this first polarity with respect to terminals 49 and 51, diode 60 is forward biased to allow current flow through lighting element 58 regardless of the setting of manual switch 56.

In a second mode, relay 44 is held off and relay 46 is energized, thereby reversing the polarity of the applied voltage across terminals 49 and 51. Terminal 49 is placed at ground and terminal 51 is placed at a positive voltage. Under this condition, diode 60 is reverse biased, and, hence, lighting element 58 is only supplied current by placing manual switch 56 in an ON or conducting state.

Figure 4:
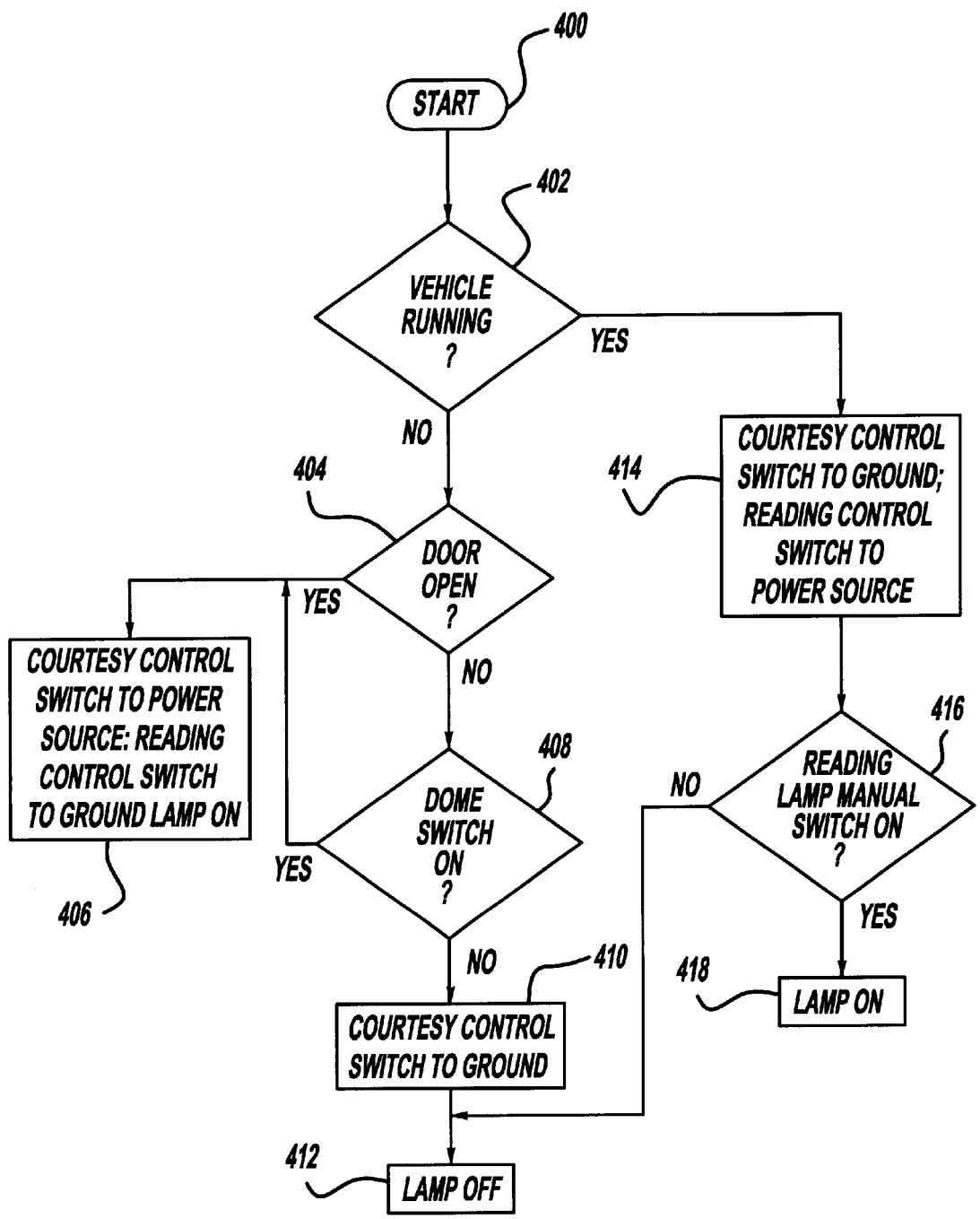
FIG. 4 is a block diagram outlining a method of operating a lamp assembly according to the present invention.

The block diagram shown in FIG. 4, demonstrates one method of controlling lamp assembly 52 using control module 38. For this example, assume that lamp assembly 52 is a combined courtesy and reading lamp in the vehicle. Switching element 44 will be the courtesy mode control switch, while switching element 46 will be the reading lamp mode control switch.

Upon entering the routine at step 400, control module 38 determines at step 402 whether the vehicle's engine is running. If it is not, then module 38 determines whether a vehicle door is open at step 404, or if a courtesy dome light switch is turned on at step 408. If either condition exists, module 38 energizes courtesy control switch 44 closing contact 50a, at step 406, allowing current to flow through diode 60 and illuminating lighting element 58. To complete the current path, reading control contact 50b is put to ground via control module 38.

When the vehicle door is closed at step 404, and the courtesy dome light switch is determined by control module 38 to be off at step 408, courtesy control switch 44 de-energizes at step 410, opening courtesy control contact 50a. Once contact 50a opens, the current flow through diode 60 ceases, turning lamp assembly 52 off at step 412.

When the vehicle is determined to be running at step 402, reading control switch 46 energizes and courtesy control switch 44 is de-energized. Under these switch states, the consumer can only illuminate lighting element 58 by actuating an interior reading lamp switch 56 located at lamp assembly 52. Operating the interior reading lamp switch at step 416 closes lamp assembly switch 56, allowing current to flow through lighting element 58 to turn the lamp on at step 418. Otherwise, lamp assembly 52 is held off at step 412.

Figure 5:
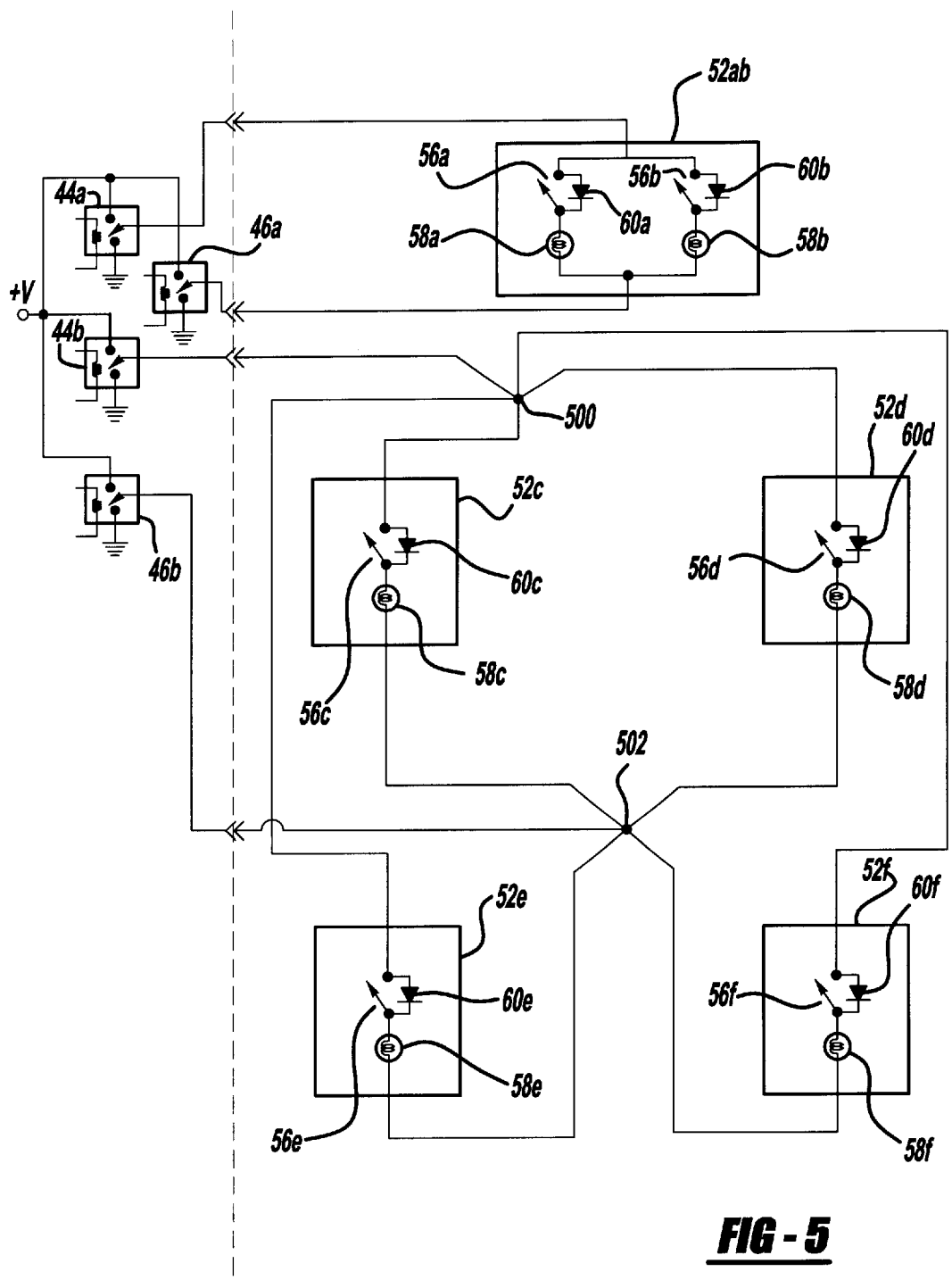
FIG. 5 is a schematic diagram of a multiple lamp interior lighting assembly according to the present invention.

The interior lamp lighting assembly as discussed herein, has been explained and illustrated using a single lamp assembly model. It is to be understood, however, that the vehicular light system disclosed herein, can be implemented in a multiple lamp assembly configuration, providing the same functionality as the single assembly discussed above. FIG. 5 illustrates an example of the present invention implemented with multiple lamp assemblies.

The arrangement for FIG. 5 is adapted to a typical minivan interior where unit 52ab is a dual lamp front seat reading/courtesy unit, 52c is a left side mid seat reading/courtesy unit, 52d is a right side mid seat unit, and 52e and 52f are left and right rear seat units, respectively.

Courtesy control relay 44a and reading control relay 46a control the voltage polarity to the terminals of unit 52ab. Courtesy control relay 44b and reading control relay 46b control the voltage polarity presented to the mid and rear units via nodes 500 and 502. Each of the lamps in this arrangement is controlled in a manner identical to that set forth above with respect to the single lamp example of FIG. 3.

The description of the invention is merely exemplary in nature and, thus, variations that do not depart from the gist of the invention are intended to be within the scope of the invention. Such variations are not to be regarded as a departure from the spirit and scope of the invention. For example the invention can provide a gradual fade to off, or a gradual build-up from off to fully on, for lamps arranged in accordance with the invention. This may be accomplished by having control module 38 pulse width modulate control switches 44 and/or 46. In this case, solid state switches are more appropriate than electromechanical relays.

What is claimed is:

1. A vehicle lamp assembly comprising:
    first and second terminals adapted to be coupled to an electric power source;
    a lighting element having a first end and a second end, the first end coupled to the first terminal;
    a dual position manual switch coupled between the second end of the lighting element and the second terminal; and
    a diode coupled between the second end of the lighting element and the second terminal, whereby the diode is operative to supply current to the lighting element wherever the electric power supply has a first polarity with respect to the first and second terminals, and the manual switch is operative in an ON state to supply current to the lighting element whenever the electric power supply has a second polarity opposite to the first polarity with respect to the first and second terminals.

2. The vehicle lamp assembly of claim 1 further comprising:
    a first switching element operative in a first state to couple a non-zero potential from the electric power source to the first terminal and operative in a second state to couple ground potential to the first terminal; and
    a second switching element operative in a first state to couple a non-zero potential from the electric power source to the second terminal and operative in a second state to couple ground potential to the second terminal.

3. The vehicle lamp assembly of claim 2 further comprising a power control unit coupled to a first control input of the first switching element and coupled to a second control input of the second switching element, the power control unit operative, via the first and second control inputs, to selectively place the first and second switching elements in their first and second states.

4. The vehicle lamp assembly of claim 1 wherein the diode has an anode electrode coupled to the first terminal and a cathode electrode coupled to the second end of the lighting element.

5. The vehicle lamp assembly of claim 3 wherein the power control unit is further operative to place the first switching element in its first state and the second switching element in its second state to forward bias the diode whenever a vehicle door is open.

6. The vehicle lamp assembly of claim 3 wherein the power control unit is further operative to place the first switching element in its second state and the second switching element in its first state to reverse bias the diode whenever the vehicle's engine is running.

* * * * *